Jan. 17, 1956  W. W. ODELL  2,731,335
PROCESS OF TREATING GASIFORM FLUIDS AT ELEVATED TEMPERATURES
Filed Jan. 16, 1952
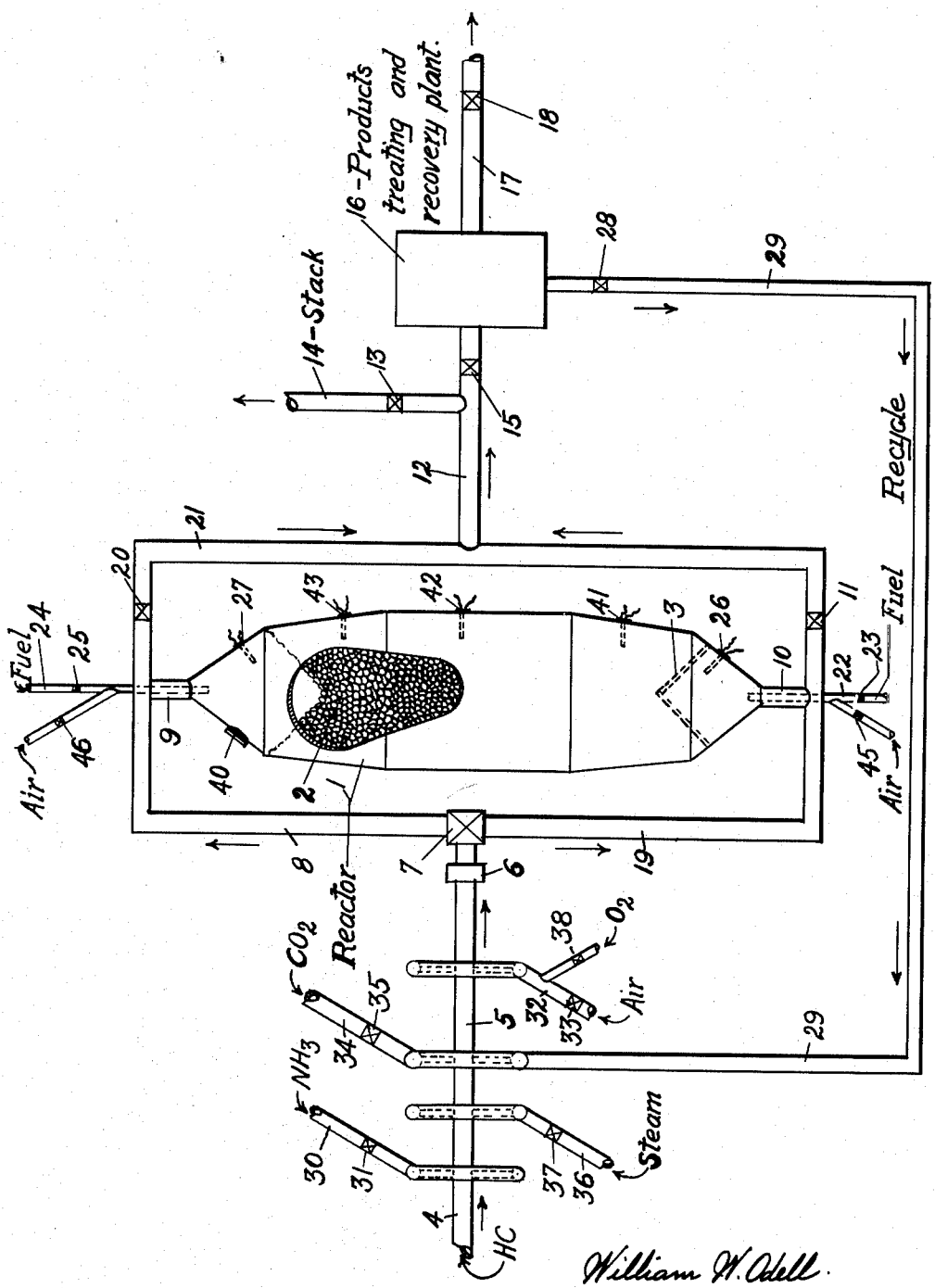
William W. Odell
INVENTOR
by Munson H. Lane
atty.

United States Patent Office 2,731,335
Patented Jan. 17, 1956

2,731,335

PROCESS OF TREATING GASIFORM FLUIDS AT ELEVATED TEMPERATURES

William W. Odell, Amherst, Va.

Application January 16, 1952, Serial No. 266,738

22 Claims. (Cl. 48—197)

This invention relates to a substantially continuous process of treating gasiform fluids at elevated temperatures, thereby beneficiating such a fluid, purifying such a fluid and or making valuable reaction products therefrom. In particular the process relates to a method of heating a stream of fluid to be treated, to a reaction temperature, maintaining it at that temperature for a controlled brief period and immediately rapidly cooling the stream before it leaves the reactor to a lower temperature where further chemical reaction is inhibited. The present application discloses the conversion of organic sulfur compounds commonly present as impurities in natural gas and other gases, including oil gas and various types of manufactured gas and it also includes the re-forming of hydrocarbons. Claims specific to the treatment of sulphur-containing gases are included in my application Serial No. 483,152, filed January 20, 1955.

This application is continuation in part of Serial No. 670,409 filed by me in the U. S. Patent Office, May 17, 1946 (now abandoned), which application was superseded by my application Serial No. 266,614, filed January 16, 1952, now Patent No. 2,700,600, dated January 25, 1955. In said patent the claims are drawn to operations requiring a hot zone temperature in the range 1650°–2300° F. and to the treatment of hydrocarbons. The present case is largely confined to reactions occurring at temperatures below 1600° F. but above 400° F. and includes major reactants other than hydrocarbons, and also outlet temperatures which while substantially lower than the temperature of the hot zone may be as high as 600° F. or somewhat more where the hot zone temperatures are in the higher portion of the aforesaid range, it being a feature of the present invention that all portions of the bed of the reaction chamber other than the hot zone are at a lower temperature than the temperature of the hot zone itself.

One of the objects of this invention is to treat a gaseous fluid for the conversion of impurities initially present therein to a substance more readily removed from said fluid, such for example as small amounts of organic sulfur compounds in natural gas or manufactured gas. Another object is to promote chemical reactions at elevated temperatures in a hot zone of a reactor as a stream initially containing the reactant substances passes at a high, controlled velocity through the reactor; the passage through the reactor being such that the stream is first preheated in the inlet-end zone, then the reactants are reacted in an intermediate hot zone and immediately thereafter the stream of reaction products is rapidly cooled to a temperature below about 600° F. in said reactor in the zone thereof adjacent the outlet end, that is, immediately down stream of the hot zone. Another object is to maintain a high temperature, below 1600° F. but above 400° F. in the hot zone by internally generated heat, namely by heat of reaction in the flowing stream. Still another object is to circulate as fuel in the stream fed to the reactor some of the products from the stream of reaction products. Other objects will become evident from the disclosures herein made.

Frequently natural gas is found in which the content of mercaptans is so high that the gas is ill suited for city distribution; the mercaptans must be removed from this gas. The amount present may be say 8 grains per 100 cubic feet or 80 grains per 1000 cubic feet. The conversion temperature of these mercaptans in the presence of steam is below the ignition temperature of methane and ethane, the major combustible components of natural gas. Iron, chromium or aluminum oxides catalyze the oxidation of the organic sulfur compounds at temperatures as low as 400° F. when a small amount of oxygen is present, forming $SO_2$, but in the presence of steam and reducing gases also, the end product is $H_2S$. By burning sufficient fuel in the gas stream to maintain the desired temperature the conversion is readily made.

One form of apparatus in which this invention may be practiced is shown diagrammatically in elevation in the figure which is in essence a flow diagram.

In the figure the refractory lined reactor 1 confines a deep stationary bed 2 of small-size refractory contact solids which solids may be catalyst material and which are supported on grid 3. Reactant material such as gasiform fluid hydrocarbons are supplied to the reactor through valve 4, conduit 5 mixing chamber 6, three-way valve 7, conduit 8 and inlet 9, passing down through the bed of solids 2, exiting through offtake 10 and passing on through valve 11, conduit 12, stack valve 13 and stack 14 or passing from 12 through valve 15 to a plant 16 of known design for cooling, treating and condensing, and for recovering valuable reaction products, from whence the major stream of desired products pass through conduit 17 and valve 18 to storage or use. When an up run is made through the bed valve 11 is closed and valve 15 is open, and the gaseous stream passes from 7 through conduit 19, inlet 10 out through outlet 9, valve 20, conduits 21 and 12, valve 15, plant 16, conduit 17 and valve 18; valve 13 is used to conduct gases to the stack 14. Auxiliary fuel is or may be supplied to the reactor through conduit 22 and valve 23 and also through conduit 24 and valve 25. Recirculated gas from plant 16 passes through valve 28 and conduit 29 to conduit 5. Ammonia gas or other reactant may be admitted to 5 through 30 and 31; oxygen, air or oxygen enriched air may be admitted to 5 through 32, 33 and 38; $CO_2$ may be admitted to 5 through 34 and 35 and steam may be admitted through 36 and 37. Thermocouples are shown at 26, 27, 41, 42 and 43. Air inlet valves 45 and 46 supply air for burning fuel introduced respectively through 23 and 25. Door 40 is employed as a means of introducing a hot medium for initially igniting fuel supplied through either conduit 8 or valve 25. Oxygen is admitted to the system through valve 38. A portion of reactor 1 is cut away in the figure to show the bed of small-size solids 2. As in the parent case all of the reactants are introduced in the stream prior to the passage of the stream completely through the bed.

In the practice of this invention a fluid stream initially comprising the gasiform fluid to be treated, admixed with the selected amount of one or more chosen reactants, is passed through the reactor 1 of the figure and clear through the bed of small-size solids 2 in alternate cycles, from the bottom upwardly and from the top downwardly, the stream directly contacting the solids in a zone of bed 2 between the ends thereof which is at a considerably higher temperature than the solids in the adjacent upper and lower portions of said bed. Thus the substance to be treated picks up sensible heat from the inlet zone of the bed, becomes preheated to reaction temperature as it approaches the reaction zone (hot zone) reacts in the hot zone from which it immediately passes through progressively cooler zones wherein the reaction products are immediately cooled to a much lower temperature than prevails in said hot zone. The temperature in the hot zone between the ends of the bed is maintained at a level favorable for promoting particular reactions by conducting combustion reactions (exothermic reactions) in said zone in said stream as the stream passes through the bed. In some instances, as will be made clear, the hot zone should be very thin, 4 to 10 inches, and in other cases a much deeper hot zone is desired and employed. When a very brief duration of contact of the stream with the hot zone solids is desired, the stream is passed through the bed at a high velocity and the solids in the hot zone are small, preferably in the range ⅜ to ⅞ inch, whereas in the adjacent zones the solids may be the same size smaller or larger, say ¼ to 1¼ inches. Usually it is preferable that the end zone solids be somewhat larger than those in the middle, hot zone. These are not limiting sizes but preferred sizes. In operation the hot zone moves toward the outlet end of the bed so that the thickness of the layer of small size solids, say ⅝ inch in the intermediate zone may be 6–8 feet or thicker, even though the true hot zone is only 10 inches thick; the hot zone migrates up and down in the region of the small size solids, 6 to about 8 feet in this particular case.

Some of the reactions which may be promoted in the practice of this invention are illustrated in effect by equations as follows:

(1) $CS_2 + 3O_2 = CO_2 + 2SO_2$   Exothermic
(2) $CS_2 + 2H_2O = 2H_2S + CO_2$   Endothermic
(3) $CS_2 + O_2 = CO_2 + S_2$   Exothermic
(4) $CH_4 + NH_3 = HCN + 3H_2$   Endothermic
(5) $C_4H_{10} + heat = 2C_2H_4 + C_2H_6 + CH_4$   Endothermic
(6) $2C_4H_{10} + heat = 2C_2H_4 + C_3H_6 + CH_4 + H_2$   Endothermic
(7) $C_4H_{10} + heat = C_3H_6 + CH_4$   Endothermic
(8) $2C_4H_{10} + heat = C_3H_6 + C_2H_4 + C_2H_6 + CH_4$   Endothermic
(9) Pet. naphtha + heat = $C_6H_6$, $C_6H_5CH_3$, $C_6H_4(CH_3)_2$ plus other vapors and gases
(10) $2NO + 2H_2 = 2H_2O + N_2$   Exothermic
(11) $C_2H_2 + 2.5O_2 = 2CO_2 + H_2O +$   Exothermic
(12) $C_2H_2 + O_2 = 2CO + H_2$   Exothermic
(13) $CS_2 + 4H_2 = CH_4 + 2H_2S$   Exothermic
(14) $2H_2S + O_2 = S_2 + 2H_2O$   Strongly exothermic
(15) $C_6H_{14} + heat = C_6H_6 + 4H_2$
      (n-hexane)      (benzine)
(16) $C_7H_{16} + heat = C_6H_5CH_3 + 4H_2$
      (n-heptane)     (toluene)

EXAMPLE 1

Referring to the figure and considering the conversion of $CS_2$ initially present in oil gas in a concentration of 50 grains per 100 cubic feet; the oil gas having been treated previously for the removal of $H_2S$. A stream of air is passed through the reactor 1 by opening valves 33, 7, 20 and 13, whereby the latter stream passes serially through conduit 5 mixing chamber 6, valve 7, conduit 8, inlet 9, through bed 2 and grid 3 and out through 10, 11, 12, 13 and stack 14. Fuel gas is now introduced into the air stream by opening valve 25 in conduit 24; the fuel gas is ignited through ignition door 40. The combustion is continued, maintaining a large excess of air so that the products of combustion are not above about 1400° F. to 1550° F. After blasting in this manner for 15 to 30 minutes, according to blasting rate, the temperature of the solids in the top of bed 2 will be at a temperature approximately 1300° to 1500° F. for a considerable depth as indicated by the suitably connected thermocouples 27 and 43. Fuel gas valve 25 is now closed and the air blasting is continued. After another 15 to 30 minutes the hot zone will have moved down almost to the middle of the bed as indicated by the pyrometers 42 and 43, this region being at a temperature approximating 1300° F. to 1500° F. The air valve 33 is now closed, and stack valve 13 is also closed after first making a brief steam purge by opening valve 37 for 5 to 10 seconds. Now the stream containing the oil gas to be treated is admitted preferably at a temperature below about 300° F. by opening valve 4 and steam is also admitted, preferably at about 300° by opening valve 37, the stream passing through conduit 5, mixing chamber 6, valve 7, conduit 8 and inlet 9, exiting through offtake 10 from which it passes through 11, 12, valve 15 which is now open, to products treating plant 16, the finally purified product passing on through 17 and 18 to points of use or storage. During the passage of the stream through the hot zone the $CS_2$ reacts chemically, partly by the endothermic reaction expressed by Equation 2 but it is possible that in this particular example some of it reacts according to Equation 13 which is exothermic. To maintain the temperature in the hot zone some additional heat is required. A small amount of oxygen is admitted by opening valve 38 (air can be used when nitrogen dilution is not objectionable). Not only does this operation provide the necessary heat by promoting combustion in the hot zone, but it first attacks the $CS_2$ by reaction of Equations 1 and 3 the ignition temperature of $CS_2$ being much lower than that of the $CH_4$, $CO$, $H_2$ and $C_2H_6$ of the oil gas. At any rate the $CS_2$ initially present is all converted in the stream as it passes through the reactor. The hot zone tends to move downwardly during this down run and after a temperature of about 310° to about 360° F. is reached in the stream passing out of the bed, as indicated by thermocouple 26, the direction of the stream through the bed is reversed, the stream now passing from 7 through 19, 10, grid 3, bed 2 and 9, 20, 21, 12, 15, 16, 17 and 18. This up run is continued until the thermocouple 27 indicates about 310° to 360° F. and another reversal is made. The reversals are kept up in this manner so that the hot zone is confined in the middle zone (the zone of the bed between the ends thereof) with relatively cool end zones. The temperature of the stream discharged from the bed immediately after a reversal is the same as that of the inlet stream, but in order to avoid an excess of reversals and in order to make long runs it is usually desirable to make a run until the discharge temperature is 50° to 200° or in some cases even somewhat more above the inlet feed temperature. The difference between inlet and outlet temperatures represents lost energy which must be made up by burning combustible matter in the stream in the hot zone. The actual heat of reaction in the conversion of this small amount of $CS_2$ is trivial, hence in this example the combustion promoted in the hot zone is primarily for the purpose of making up for losses and keeping the chosen temperature in the hot zone.

The quantities of materials used in this example and under the conditions are:

| | |
|---|---|
| Oil gas, cu. ft. | 1000 |
| Steam, pounds | 1 to 2 |
| Oxygen, cu. ft. | 4 to 10 |
| Superficial velocity in bed, feet per minute | 200 |
| Size of solids in hot zone diameter, inches | ⅝ |
| Pressure at feed end of reactor, lbs. gage | 15 |
| Depth of zone of ⅝ inch pebbles, feet | 14 |
| True thickness of hot zone, feet | 4 |
| Total depth of bed, feet | 18 |
| Period between reversals, minutes: | |
|   1st reversal | 16 |
|   Subsequent | 30 |

When the gas contains considerable $H_2$ the sulfur in the stream leaving the reactor is substantially all in the form of $H_2S$ and the amount of $CS_2$ remaining unreacted is substantially zero. However, under some conditions, particularly when the amount of steam used is low and/or the amount of $O_2$ used is high some of the sulfur passes out in the elemental form as sulfur vapor. In the foregoing example if the sulfur is allowed or caused to be in the elemental state as discharged from the reactor the gas temperature at the outlet should be 340° F. or higher because of the very low vapor pressure of sulfur at lower temperatures; the outgoing stream should be at a temperature above the dew point of sulfur. Under these conditions the feed mixture should be at substantially 340° F. also. With greater amounts of sulfur present higher temperatures than 340° F. should obtain in the outlet gas stream to prevent sulfur condensation. The vapor pressure of sulfur at 464° F. is 8.7 mm. of Hg whereas at 500° F. it is 16 mm. and at 600° F. it is 70 mm.

As a modification of Example 1, consider a natural gas containing 400 grains of sulfur, as $H_2S$, per 100 cu. ft. This gas may be oxidized in a similar manner as described and the sulfur can be converted to elemental sulfur vapors and recovered as a valuable by-product. The cycle or run should be such that the discharge temperature should be about 480° F. at the start of the run and may be higher at the end of the run when flow is reversed. Under these conditions the feed of gas and oxidants may be and should be at a temperature of about 480° F. At 480° F. the sulfur vapor from the oxidation of the $H_2S$ will remain in the vapor phase. In this case the major reaction may be expressed by Equation 14 in which 2 moles of $H_2S$ oxidizing to $S_2$ and $H_2O$ liberate 235,960 B. t. u. This amount of heat, which is 2000 B. t. u. for 4000 grains of $H_2S$, is just enough to carry the reaction in a well insulated reactor, provided the average offtake temperature of the stream is not more than 50 to 80° higher than the feed temperature. In all instances the amount of oxygen introduced with the foul gas is sufficient only to maintain the operating hot zone temperature. The latter temperature in this modification of Example 1 may be 1250° to 1400° F. The amount of oxygen introduced per 1000 cu. ft. of gas to be treated may be in the range 3.5 to 5.0 cu. ft. A small amount of steam is desired because it appears to help the reaction and it inhibits premature ignition or oxidation of the $H_2S$ at low temperatures. When large quantities of steam are present, particularly when the flow rate through the bed is not high, there is a tendency for sulfur to react with the steam forming $SO_2$ and $H_2S$. Steam in excess retards the reaction of Equation 14. The amount of water vapor initially present in the feed in this example may vary from 0.1 to 2 percent, or somewhat more for optimum results. When the pebbles or other solids of which bed 2 may be comprised are iron oxide, alumina or bauxite, the use of small amounts of steam is helpful in keeping the catalyst active over a longer period of time than when no steam is used. In thus reacting appreciably large amounts of $H_2S$ whereby temperatures of 340° F. and higher are employed in the feed gas stream care should be taken to avoid the use of catalytic solids in the end zones. Premature combustion of the $H_2S$ in the latter zones decreases the economy of the process.

EXAMPLE 2

*Incomplete cracking of naphtha in a vapor phase*

Referring to the figure, the initial heating step is made and a hot zone is established in the reactor in a zone of 2 between the top and bottom thereof substantially as outlined in Example 1. In this case a temperature of 1500° F. is desired in the hot zone and a thin hot zone is also desired. The solids in this hot zone should preferably be about ½ to ⅝ inch mean diameter, and they may be pebbles, prepared catalyst pellets, alumina, chromium oxide, quartz or other refractory; quartz is used in this specific example. After the hot zone has been established, vapors of 390° F. end point naphtha are introduced by opening valve 4, steam is simultaneously introduced by opening valve 37 and oxygen is introduced by opening valve 38. The mixture passes as a stream initially through 5, 6, 7, 8, 9, bed 2, grid 3, offtake 10, and 11, 12, 15, 16, 17 and 18. The temperature of the naphtha supplied is 400° F.; the steam is preferably superheated and at about 400 to 410° F. and the oxygen supplied is also at a temperature in the latter range. Thus the feed temperature at the inlet to the bed, as indicated by thermocouple 27 is about 400° F. A hot zone thickness of about 1 foot is employed and the superficial velocity of the stream through the bed based on the initial unreacted mixture is 2.5 feet per second but may be more or less according to the degree of modification of results that is desired. The naphtha is cracked, but because of the thinness of the hot zone and the immediate quick cooling of the stream of reaction products in the bed 2 to a temperature below cracking temperature, and also because of the brief heating period (contact with the hot quartz) only a small amount of gas is formed and substantially no carbon is formed. The gaseous products are chiefly ethylene, methane, hydrogen, and oxides of carbon, and also butadiene in recoverable valuable amounts. The quick cooling of the stream in the bed serves to preserve the butadiene formed, from further reaction, but also to prevent its polymerization and allows recovery of the maximum amount of it; one should quickly cool it to a still lower temperature in treating plant 16. The liquid products formed in the stream are recovered in 16 by well-known methods of cooling, scrubbing, condensing, adsorption and the like; they are largely aromatic compounds which are chiefly benzol, xylol and toluol. The minimum temperature of the outlet gas stream, after there have been a number of reversals of cycle and operations are well established is about 400° to 410° F. The maximum temperature is, of course, higher than this but it need not be much higher and I find it can readily be confined to a mean of 50° to 100° F. above the latter range; in this example it is 452° F. or 52° above the temperature of the feed stream. When the outlet stream temperature reaches a temperature of say 100° F. above feed temperature, the reversal of flow of the stream through the bed is made as in Example 1. Now, the amount of oxygen supplied, as before, is that amount which maintains the temperature of approximately 1450° to 1500° F. in the hot zone. The thermocouples 41, 42 and 43 may be used as a guide. A further guide is the volume of gas made per unit of naphtha fed, this volume increases with rising temperature, or decreasing velocity or both. Again, with a lowering of temperature the percentage of aromatics in the liquid products is markedly reduced. The amount of steam used per mole of naphtha (based on mean molecular weight) charged to the reactor varies with different base naphthas but in this example the amount used is approximately ½ pound, but it may be more or somewhat less. In all cases the amount of steam should be small relative to the total amount of hydrocarbons treated, but it should be sufficient to prevent premature reaction in the end zones. The amount of oxygen required is small, but it is considerably more than that used in Example 1, because of the endothermic nature of the reaction. These reactions may be represented by Equations 15 and 16. The (conversion) shift from paraffin to aromatic occurs to the extent of more than 50 per cent and varies with changes in the stream velocity, temperature, depth of hot zone and catalyst. Low velocities are required when appreciably lower temperatures are employed. The amount of oxygen required will vary almost proportional to the amount of conversion, but in starting the operation it is well to use 70 cu. ft. of oxygen per pound mole of naphtha (based on mean molecular weight), then adjust the oxygen supply to maintain the temperature. There can be considerable variation in the oxygen requirements according to the completeness of combustion of the fuel consumed by the oxygen. Expressed differently, when the oxides of carbon in the product stream are comprised chiefly of $CO_2$ less total oxygen is required by the process than when CO is the major oxide. When the conversion of the naphtha is quite complete the oxygen requirement may be about double the 70 cu. ft. mentioned above, varying with the amount of gas formed and other factors. Because of the rather low ignition temperature of naphtha vapor it is necessary, in employing mixed oxygen and naphtha, to keep the velocity high in the feed lines and up to the bed of solids to avoid the danger of ignition prior to the contact of the mixture with the solids. With increments in the amount of oxygen used in the feed mixture the tendency to "back fire" or to pre-ignition increases. When the oxygen content is high, say about 130 cu. ft. per mole of naphtha vapor, it is preferable to use more steam with the mixture to avoid back fire and to minimize carbon formation. The bed of solids is advantageously of smaller diameter at the ends than in the zones between the ends thereof, as shown in the figure, to aid in avoiding preignition or pre-oxidation of the feed mixture. This shaping of the bed is not necessary for many reactions which do not have a tendency to pre-ignition; in such cases a cylindrical bed may be employed.

Although the operation can be carried out at various pressures, there is a limit. As the pressure and/or temperature rises the limits of the amount of the hydrocarbon that can be present without flame propagating through the mixture with oxygen broadens, namely the upper limit increases and the lower limit decreases. In order for the present invention to operate it is necessary that flame does not propagate in the end zones through the gas-oxygen mixture fed to the reactor. For economic reasons it usually is desirable to avoid dilution of the feed other than by steam already mentioned which is a help in retarding flame propagation. It is desirable that the pressure in the reactor be less than about 7 atmospheres, although higher pressures might be employed. In this example the pressure is 12 pounds gage at the feed end of the bed. Under all conditions it is necessary to operate under pressure conditions that will not cause premature flame propagation in the feed mixture in the end zones which are not catalyst zones.

Before passing to another example, attention is called to an embodiment of the invention which is useful in the last example. In many cases it is not desirable to burn solely part of the main reactant, the feed hydrocarbon, in supplying the heat absorbed by the process; in such cases fuel gas selected for the purpose may be introduced through valves 23 and 25 of the figure on the up and down runs respectively, or recycle of some of the non-condensed product gas from plant 16 through valve 28 and conduit 29 may be used. This recycle gas may be used in excess of fuel requirements. Another advantage is gained by the latter recirculation of gas, namely the dilution of the naphtha vapor permits a lower temperature in the feed and therefore in the discharge gas as well. This lower temperature further minimizes dangers of back flame propagation. The amount of fuel burned is, of course, the chemical equivalent of the oxygen in the feed.

Single hydrocarbons may be reacted in the manner described above and the best or optimum temperature for getting the desired results can be obtained by operating over a range of temperatures and comparing results. Under these conditions it may be advantageous to introduce fuel and air through valves 23 and 45, and 25 and 46, and admit the hydrocarbon to be treated through valve 4 of the figure, although this is not necessary; it is desirable to supply other fuel than the hydrocarbon under treatment when the latter is expensive. Considering reaction of Equation 7, the heat required for complete reaction is approximately 3.0 per cent of the total butane fed to the reactor and the amount of oxygen required is about 15.5 to 16.0 per cent of the volume of the total butane fed.

After a goodly number of both up and down runs have been made it is frequently advantageous to drive the hot zone completely to one end (preferably the top end so as to protect the grid) by blasting with air alone, by opening valve 33 and stack valve 13 and causing the air stream to pass into 5 and serially through 6, 7, 19, 10, 3, 2, 9, 20, 12, 13 and 14, while valves 15 and 11 are closed. This burns out any carbon that may be present, reactivates the catalyst surface and is helpful in maintaining a sharply defined hot zone which is again established as in the first instance by blowing a gasiform stream (preferably air) downwardly through the bed for a period.

At low rates of flow through the bed using butane vapor and a temperature of 1290° F. about half of the butane passes through the bed undecomposed and the gas composition, corrected for combustion products is as follows, with a hot zone depth of 18 inches.

| | Percent |
|---|---|
| Hydrogen | 5.7 |
| Methane | 10.5 |
| Ethylene | 4.8 |
| Ethane | 1.9 |
| Propylene | 14.6 |
| Propane | .1 |
| Butylene | .8 |
| Butane | 61.6 |
| | 100.0 |

The amount of oxygen used is about 10 per cent of the volume of butane fed to the reactor in this instance, and the superficial velocity, calculated on the basis of flow of the feed mixture into the bed at feed temperature in the inlet-end cylindrical-portion of the bed is 2 feet per second. The volume increases considerably as the stream passes through the bed, and accordingly the velocity increases. The pressure is one atmosphere gage but it may be 1 to 10 atmospheres; at 10 atmospheres it is necessary to keep the feed temperature high enough to prevent condensation of steam in the feed lines.

At higher temperatures of the order of 1350° to 1400° F. most of the butane is converted and the yields of methane and unsaturates is higher. Carbon does not deposit if the velocity is high enough. Alumina and chromium oxide are satisfactory for contact solids. The quantity of steam used may be of the order of ½ lb. to 1.0 lb. more or less per mole of butane treated. The cyclic method of operation is performed as described in Example 1; the inlet temperature may be low, say 150 to 200° F. in this case and the mean outlet temperature may be as low as 160 to say 210° F.

When it is desirable to convert the naphtha or butane or other vaporous hydrocarbon completely to gas products more steam is used, a deeper hot zone is employed 3 feet or more, instead of 1 foot, larger size pebbles are employed in the hot zone, say 1-inch diameter, and air may be substituted at least in part for the oxygen, provided nitrogen in the product gas is not deleterious to its use; density limits in specifications may require that oxygen without air be used. The velocity through the bed may be reduced, but preferably not to the point where appreciable amounts of carbon are liberated. The operations are the same as described above and the cycles are reversed when the mean outlet temperature is about 10° to 100° F. above the feed temperature. With butane the feed temperature may be low, say 100° to 200° F. and the oxygen at a temperature that will not cause the steam to condense in the inlet lines, say 250° to 300° F.

EXAMPLE 3

*Removal of nitric oxide from gas containing hydrogen*

Referring to Equation 10 the reaction is exothermic but in treating manufactured gas for removal of NO the heat generated by the reaction is infinitesimally small and can be neglected. In carrying out the reaction with a gas containing say 6 parts per million of NO it is merely necessary to make certain that the gas contains $H_2$ for the reaction and that heat is generated by combustion in the hot zone to maintain a suitable elevated temperature, 1250° to about 1500° F. is satisfactory. The amount of heat energy required in a well insulated reactor with inlet feed temperatures of say 150° F. and outlet final temperature at end of run higher than 150 but less than 280° F. is very small being of the order of 2400 B. t. u. per 1000 cu. ft. of gas passed. The operation is in cycles as in the previously cited example. In this case higher pressures may advantageously be used, however in general 5 to 500 pounds gage pressure will prove satisfactory. So far as I am aware this is the most economical method of removing an oxide of nitrogen from such gases as coal gas, coke oven gas, producer gas, and water gas containing blow-run gas.

In carrying out the operation the solids in bed 2 of the figure are preferably pebbles of a diameter of ½ to 1 inch. As in the other examples the pebbles in any one horizontal layer or stratum are substantially the same size. In this example the end strata may advantageously have pebbles of smaller size than the middle zone which zone should occupy about ½ to ¾ of the bed. The gas to be treated is introduced through valve 4 and conduit 5 and the oxygen, a small amount only, is introduced by opening valve 38, the mixture passing through mixing box 6, valve 7 and on through the bed in cycles as described. A small amount of steam may be used by opening steam valve 37; steam is advantageous in particular when the hydrogen content of the gas is low. The amount of oxygen added is only that required to maintain the desired temperature in the hot zone of bed 2; in this case it is just enough to generate heat in the hot zone equivalent to about 2400 B. t. u. per 1000 cu. ft. of gas passed. If radiation losses are high more heat may be required than 2400 B. t. u. The hot zone should preferably be about 3 to 5 feet thick and the initial superficial velocity in the inlet of the cylindrical portion of the bed, referring to the figure, is 1 to 2.0 feet per second. The reversal of flow may be made when the outlet gas temperature is 50° to 100° F. above the feed temperature. As in the other cases the inlet feed temperature should be above the dew point of the $H_2O$ in the feed.

It will be understood that in any of the procedures in the practice of this invention the refractory, incombustible solids, of which bed 2 of the figure is comprised, may be catalyst, particularly in the hot zone region, selected to catalyze the particular desired reactions; known catalysts having the desired properties may be employed. These solids preferably should be of a size ¼ inch in diameter to about 1 inch; smaller sizes not only increase resistance to flow but tend to be carried out of the reactor entrained in the gas stream. Furthermore, solids smaller than about ¼ inch diameter tend to become sticky and mat together in time in the hot zone, at temperatures of the order of 1500° F. In general the desired or preferred size is ½ to ¾ inch diameter solids. Usually the solids in the end zones should not be catalysts.

It is possible, in using ½ inch solids in a deep bed, say 15 feet deep, to make a long run before the outlet temperature of the stream (temperature as the stream is discharged from the bed) rises above the temperature of the stream as fed to the beds. Thus it is possible to so operate that the outlet gas temperature is substantially the same as the inlet or feed stream temperature. However, in order to make runs as long as possible and to minimize the number of reversals per unit of time it is usually economical to make reversals after the outlet gas temperature as discharged from the bed is somewhat above the feed stream temperature. One may choose say 10°, 50° or 400° F. as the limit of difference between inlet and outlet temperatures. When 400° F. is chosen more combustion must be promoted in the hot zone than when 10° F. is the limit. When the reaction promoted is strongly exothermic it is well to allow the 400° F. differential to obtain.

The thickness of the hot zone is determined by the length of the initial heating period; it will be about twice as thick with 30 minute heating period as with a 15 minute period. The thickness once established does not change readily with the continued reversals although because of wall effect and because of difficulty in obtaining exactly the same size solids in preparing the bed, it is generally desirable to occasionally drive the hot zone completely to one end of the bed and then repeat the heating period by passing the heating gases in the opposite direction and again establishing the middle hot zone as before. This reestablishing of the hot zone may be desirable once a day or once a week and will depend on the materials treated, operating temperature in the hot zone and the size of the solids. If the first 5 or 6 runs are made with say 30 minutes between reversals with a temperature of the outlet gas at 10° F. above the feed temperature and at a later stage of operation it is found that appreciably shorter runs are necessary in order to reverse at the 10° F. differential temperature, it is an indication of a tendency of a decrease of the sharpness of the hot zone; one might call this a degradation of the hot zone. It is somewhat a matter of economics as to when to re-establish the hot zone, but in making the decision operating results must be considered. Under differing conditions the frequency of re-establishing the hot zone usually will be, as stated, within the range once a day to once a week.

Before defining my claims, it is desirable to call attention to another reaction, namely that shown by Equation 4 in which methane combines with ammonia at elevated temperatures. The temperature at which the reaction proceeds rapidly and fairly completely is 1250° to 1450° F. At such temperatures ammonia is decomposed rapidly if the duration of exposure is prolonged. The procedure to follow in making HCN in accordance with the teachings of this invention with minimum decomposition of ammonia is as follows. Establish a hot zone in the middle of bed 2 of the figure as described in Example 1, with a temperature of 1250° to 1450° F. and a thickness of 18 to 24 inches. The solids may advantageously be vanadium steel, although other catalysts may be used. The initial superficial velocity of the stream through the reactor is 2.0 to 3.5 feet per second. The stream initially comprises a mixture of $NH_3$ and $CH_4$ in substantially equal proportions. More than 50 percent of the $NH_3$ is converted to HCN and only a very small amount of $NH_3$ is decomposed. The feed temperature may be 80° to 150° F. or higher and the reversal of flow is made when the outlet gas temperature is 50° to 150° higher than the feed temperature. Oxygen is used to promote combustion in the hot zone and thus maintain the temperature. Considerable heat is required to promote this reaction, which means that considerable combustion of fuel in the hot zone is necessary. The mixture fed to the reactor may be 47 percent methane, 41 percent ammonia and 12 percent oxygen; the final adjustment of the oxygen is made to retain the temperature in the hot zone. One method of reducing the consumption of methane as fuel is to introduce a separate fuel through valves 23 and 25 with the required oxygen admitted through 45 and 46 during the up and down runs respectively and admitting the major reactants through valves 4 and 31 passing them on through 5, 6 and 7 to the reactor. The fuel thus added may preferably be one that has a lower ignition temperature than methane such as gas oil, hexane, heptane or kerosene. Such fuels burn preferentially at temperatures below the ignition temperature of methane. This method of generating heat is applicable in promoting other strongly endothermic reactions, it is the step of preferentially burning an auxiliary fuel of relatively low ignition temperature in a mixture of the fuel with oxygen in the presence of a reactant substance. In view of the foregoing description it will be clear to one skilled in the art, as to the method of using different fuels and different reactants to obtain a particular result. Steam is not a necessary reactant in making HCN; it is a product of burning the hydrocarbon fuel and is present in the hot zone without being separately introduced.

It will be understood that in all cases the gasiform stream passing out of the hot zone is immediately cooled to a considerably lower temperature in the adjacent cooler strata of the bed of solids, the solids absorbing heat from the stream and becoming heated. In this manner the hot zone migrates up and down in the bed.

In the practice of this invention the temperature in the hot zone is appreciably higher, in many cases, than the normal alteration temperature of the major reactant. This is true in the re-forming of naphtha in Example 2. Naphtha normally is severely cracked at temperatures of 1050° to 1150° F. whereas in Example 2 a temperature of 1500° F. is employed; and this latter temperature can be successfully employed without destructive cracking because of the thin hot zone, the short duration of contact of naphtha vapors with the hot solids and the immediate cooling of the stream after leaving the hot zone.

The ends of the bed 2 of the figure are concave toward the middle of the bed to minimize wall effect. The tapering end zones afford means of keeping the stream velocities high in these zones. The superficial velocities given in the examples as inlet velocities refer to the velocity in the cylindrical portion of the bed at the inlet end.

It will be understood that part of this invention, which is believed to be new, includes the step, passing a gasiform stream, initially containing a reactant adapted to react chemically thermally at elevated temperatures below about 1550° F. through a deep bed of small size solids confined in a reactor, in such a manner that the stream passes serially through a relatively cool stratum of substantially noncatalytic solids, a hot stratum of considerably hotter solids that are catalytically active, and a relatively cool stratum of substantially noncatalytic solids whereby the stream is first preheated, then passed into contact with the hotter solids in the hot zone, in which zone combustion is also promoted, for a brief period only to react the said reactant and whereby the stream of reaction products is immediately cooled in the second mentioned cool stratum.

The different temperatures for promoting different reactions will vary from 600° F. to 1500° F. In the lower end of this range combustion reactions occur chiefly by virtue of catalytic action. An oxidation catalyst may be used for the purpose such as $MnO_2$, $CuO$, $Fe_2O_3$ or $V_2O_5$.

Having described the invention so that one skilled in the art can practice it without limitation to the specific examples which are presented for illustrative purposes, I claim:

1. The process of treating gasiform fluids containing a readily combustible substance, comprising, passing a gasiform stream initially containing said substance in admixture with a gasiform medium containing essentially steam and a predetermined relatively small amount of oxygen completely through a deep, continuous, stationary bed of small-size incombustible solids while said solids are confined in an upright reactor, longitudinally in contact with said solids from one end to the opposite end of said bed while maintaining a maximum temperature hot zone comprising a stratum only of said bed between the top and bottom thereof at an elevated reaction temperature above 400° F. but below about 1600° F., at such a velocity that said substance is rapidly heated in the latter stratum and reacted chemically as said stream passes through said stratum, thereby causing the reaction of said substance to occur substantially without the formation of carbon black, continuing this operation until the temperature of the mass of solids in said opposite end of said bed is heated to a temperature somewhat above the feed temperature by the sensible heat of the thus heated stream exiting therethrough, then reversing the flow of said stream passing it through said bed in the opposite direction at a similar velocity causing said stream to first contact the heated solids adjacent the feed-end of said bed, becoming heated as the latter solids are thereby cooled, passing it on through the said hot stratum wherein it is heated to said elevated temperature and the reaction of additional amounts of said substance is promoted and passing it on out through the opposite end of said bed imparting heat to the solids adjacent the latter end until the latter solids are at a temperature somewhat above the feed temperature, said predetermined amount of oxygen being sufficient only to maintain said elevated temperature in said hot stratum by the oxidation in the latter stratum of a relatively small amount of combustible matter initially present in said admixture, the temperature within said bed being at all other portions lower than that within the maximum temperature hot zone.

2. The process defined in claim 1 in which the temperature in said hot zone is considerably below 1550° F. but above the ignition temperature of at least one of the components of the feed stream.

3. The process defined in claim 1 in which the superficial velocity of said stream is maintained in the range of 100 to 500 feet per minute.

4. The process defined in claim 1 in which superatmospheric pressure is maintained in said reactor.

5. The process defined in claim 1 in which the gas treated initially contains a readily oxidizable component as an impurity and in which said component is incompletely oxidized as said stream passes through said bed.

6. The process defined in claim 1 in which the stream passing through the hot intermediate stratum of the bed contacts catalyst solids in the latter stratum whereby said substance is catalytically reacted in said stream in the said intermediate stratum.

7. In the process of treating a combustible gasiform substance by contacting it with highly heated solids, by passing a stream containing said gasiform substance alternately up and down through a continuous deep mass of small-size incombustible refractory solids confined as a stationary bed in an upright reactor, which bed has a maximum temperature hot zone between much cooler top and bottom zones thereof, the steps comprising, maintaining a particular temperature in the hot zone by premixing with said substance a relatively small amount of an oxidizing fluid, which includes steam and a predetermined amount of oxygen, before passing the mixture as said stream into and through said bed, and economizing heat by reversing the flow of said stream through said bed when the mean temperature of the exit gas stream is of the order of 10° to 100° F. above the inlet feed temperature, said predetermined amount of oxygen being only that required to oxidize that portion of said combustible substance in said stream which is required for supplying the necessary heat to maintain said hot zone at said particular temperature within the range of 400 to 1600° F., the temperature within said bed being at all other portions lower than that within the maximum temperature hot zone.

8. In the process of treating a combustible gasiform fluid containing at least one hydrocarbon adapted to react chemically at elevated temperatures, by passing a stream initially containing said fluid and initially containing such a hydrocarbon substance, alternately up and down from one end to the opposite end through a continuous, deep mass of small-size refractory incombustible solids confined as a stationary bed in an upright reactor, which bed has a maximum temperature hot zone between the cooler top and bottom zones thereof heated to a temperature of the order of 1200°–1550° F. the steps, promoting both exothermic and endothermic reactions in said stream in said bed at temperatures below 1600° F. by mixing with said fluid as a part of said stream prior to it passing through said bed relatively small amounts of both oxygen and steam, reacting said substance by incomplete oxidation in said stream in the hot zone, cooling said stream containing reaction products in the discharge zone of said bed prior to its exit therefrom to a mean temperature of the order of 10 to 100° F. above the feed temperature of said stream by transferring sensible heat therefrom to the solids in the latter zone, reversing the flow of said stream through said bed when the mean temperature of the stream exiting from said bed is of the order of 10° to 100° F. higher than the feed temperature, and meanwhile maintaining the high temperature in the hot zone of said bed intermediate the top and bottom portions thereof by proportioning the relative amounts of said steam and oxygen initially mixed with said fluid prior to the passage of said stream through said bed, the temperature within said bed being at all other portions lower than that within the maximum temperature hot zone.

9. The substantially continuous process of treating a combustible gasiform fluid containing as a major reactant hydrocarbon vapor by contacting it with highly heated refractory incombustible solids, comprising, mixing the relatively cool fluid to be treated with a small amount of a fluid medium comprising oxygen and steam, passing a stream initially containing the mixture upwardly from the bottom and downwardly from the top, through a continuous deep mass of small-size refractory incombustible solids confined as a bed in an upright chamber, maintaining a maximum temperature hot zone between the top and bottom cooler zones thereof in which the confined solids in said hot zone are maintained at an elevated temperature in the range 1200° to 1550° F., reversing the direction of flow of said stream through said bed when the temperature of the stream exiting from said bed rises above the temperature of the feed stream by a predetermined amount, thereby heating said mixture to said elevated temperature, incompletely oxidizing said fluid in said hot zone substantially without the formation of carbon black by maintaining a high stream velocity through said hot zone, quickly cooling the stream containing reaction products as it passes from said hot zone on through a cooler zone of said bed, while imparting heat to the latter zone, so proportioning the oxygen content of said mixture that the temperature in said hot zone is maintained by combustion therein of some of said combustible fluid initially present in said mixture with the oxygen of said mixture as said stream passes through said bed, and removing the products of reaction in said stream, substantially free of carbon black, said predetermined amount being within the range 10 to 400° F. above the feed stream temperature, the temperature within said bed being at all other portions lower than that within the maximum temperature hot zone.

10. The process defined in claim 9 in which said hydrocarbon vapor is reacted catalytically in said stream as said stream passes through the hot zone by virtue of contact of said stream with hot catalyst solids in said bed.

11. The process defined in claim 9 in which the intimacy of contact of said stream with the solids of said bed is controlled by controlling the size of said solids within the range ¼ to about 1-inch diameter.

12. The process defined in claim 9 in which the duration of contact of the stream with the solids in the hot zone is controlled by limiting the thickness of said hot zone in the range of four inches to four feet.

13. The process defined in claim 9 in which a portion of the products of reaction, after removal of valuable reaction products therefrom, is recirculated back through said bed as a part of said stream.

14. The process of treating gasiform fluids containing readily oxidizable substances, comprising, passing a gasiform stream initially containing such a substance in admixture with a predetermined small amount of oxygen and a small amount of steam, the oxygen content of said mixture being in excess of the steam, through a deep, continuous stationary bed of small size, refractory, incombustible solids, while said solids are confined in an upright reactor, longitudinally in contact with said solids, from one end to the second or opposite end of said bed while maintaining a maximum temperature hot zone comprising a stratum of said bed between the top and bottom relatively cool ends thereof at an elevated, reaction temperature, within the range of approximately 400° F. and 1600° F. at a high velocity whereby said substance is rapidly heated in the latter stratum as said stream passes through said stratum, thereby causing said substance to react chemically in said stream and the reaction products to be immediately cooled in said bed, discharging the cooled reaction products from the second end of said bed substantially free of carbon black, continuing this operation until the temperature of the mass of solids adjacent the second end of said bed is raised somewhat above that of the feed mixture but below that of the maximum temperature zone by the sensible heat of said stream exiting therethrough, then reversing the flow of said stream passing it through said bed in the opposite direction at a similar velocity, causing said stream now passing through said bed to first contact the thus heated but relatively cool solids adjacent the second end thereof becoming heated as the latter solids are correspondingly cooled and to pass through the said hot stratum wherein it is heated to said reaction temperature, thereby causing an additional amount of said substance to react chemically in said stream and the reaction products thus formed to be immediately cooled in said bed, discharging the latter products from the first end of said bed substantially free of carbon black, continuing this operation until the temperature of the solids adjacent the first end of said bed is raised somewhat above that of the feed mixture but below the temperature of the hot stratum by the sensible heat of said stream exiting through the first end, and repeating the cycles; said predetermined amount of oxygen being that required to maintain said temperature in the said hot stratum of said bed by the oxidation in said stratum of combustible matter initially present in said admixture, the temperature within said bed being at all other portions lower than that within the maximum temperature hot zone.

15. The process of treating petroleum hydrocarbons such as naphtha, heptane, butane and the like in the vapor phase producing readily condensable products and combustible gas by contact with heated surfaces, comprising, mixing the hydrocarbon fluid to be treated, in the vapor phase, with steam and with a predetermined amount of oxygen, passing a stream initially comprised essentially of that mixture alternately upwardly and downwardly from one end to the opposite end clear through a continuous, deep mass of small-size refractory, incombustible solids confined as a stationary bed in an upright reactor, meanwhile maintaining a stratum of said bed as a hot zone between the top and bottom strata thereof at a high temperature but below 1600° F. while maintaining much lower temperatures in said top and bottom strata, by promoting combustion of gasiform fuel in said stream in said hot zone which fuel is initially present in said mixture, thereby first preheating said stream in the first or inlet end of said bed, then reacting said hydrocarbon as the stream passes through the hot zone, and then quickly cooling the stream containing reaction products as it passes through the relatively cool opposite end of said bed, thereby producing said products and gas, continuing this operation until the temperature of the latter stream as it leaves the bed through the relatively cool end is somewhat higher than that of the feed mixture, then reversing the direction of flow of the stream through said bed so as to maintain the hot zone in a region substantially midway the top and bottom of said bed, promoting similar reactions in said stream in said hot zone and removing the stream of reaction products and gas from the first end of said bed; said predetermined amount of oxygen being only that required to maintain the stated high temperature in said hot zone.

16. The process of treating and reacting combustible fluids adapted to react at elevated temperatures in contact with heated solids, comprising, establishing a hot zone as a stratum of a continuous deep bed of small-size, refractory solids confined as a stationary bed in an upright reactor while the top and bottom strata are relatively cool, passing a stream initially comprised of a mixture of a combustible fluid to be reacted, steam and a predetermined amount of oxygen alternately up and down clear through the bed from one end to the other, preheating said stream in an inlet end stratum of said bed by causing it to absorb sensible heat from the solids therein, further heating said stream and reacting said fluid with the formation of reaction products substantially free of carbon black in the hot zone of said bed by contact with the hot solids therein, simultaneously promoting limited combustion of combustible matter initially present in said stream, in the latter zone, then immediately cooling said stream in the outlet stratum of said bed by causing it to give up heat to the solids therein, meanwhile so controlling the stream velocity and the dependent time of contact of said stream with the solids in said hot zone that both gaseous and readily condensable products are formed in said stream, reversing the direction of flow of said stream through said bed when the temperature of the stream discharged from the outlet stratum is greater than that of the stream fed to the inlet stratum by less than 400° F. and similarly producing reaction products; the predetermined amount of oxygen being that amount only that is required to maintain a suitable reaction temperature in said hot zone below 1600° F. by the oxidation of said combustible matter in the latter zone.

17. The process defined in claim 16 in which the fluid is catalytically reacted in said hot zone by contacting small-size catalyst solids therein which are adapted to catalize the reaction of said fluid.

18. The process defined in claim 16 in which the temperature in the hot zone is maintained at approximately 1200° to 1550° F.

19. The process defined in claim 16 in which the reactant fluid is fed to the bed at a temperature of about 400° F.

20. The process defined in claim 16 in which superatmospheric pressure is maintained in the reactor as said stream passes through said bed.

21. The process defined in claim 16 in which the feed stream is supplied to said bed at a pressure of 5 to 500 pounds gage and at a temperature above the dew point of the stream components at said pressure.

22. The process defined in claim 16 in which the hot zone is so thin that the time of contact of the stream with the solids in the hot zone of said bed is so short that the stream of reaction products is substantially free of carbon black.

References Cited in the file of this patent

UNITED STATES PATENTS

| | | |
|---|---|---|
| 2,121,733 | Cottrell | June 21, 1938 |
| 2,421,744 | Daniels | June 10, 1947 |

FOREIGN PATENTS

| | | |
|---|---|---|
| 390,849 | Great Britain | Apr. 5, 1933 |